Jan. 26, 1954   A. J. TRIPODI   2,667,381
MECHANISM FOR ACTUATING DUMP BODIES
Filed Sept. 27, 1950   2 Sheets-Sheet 1
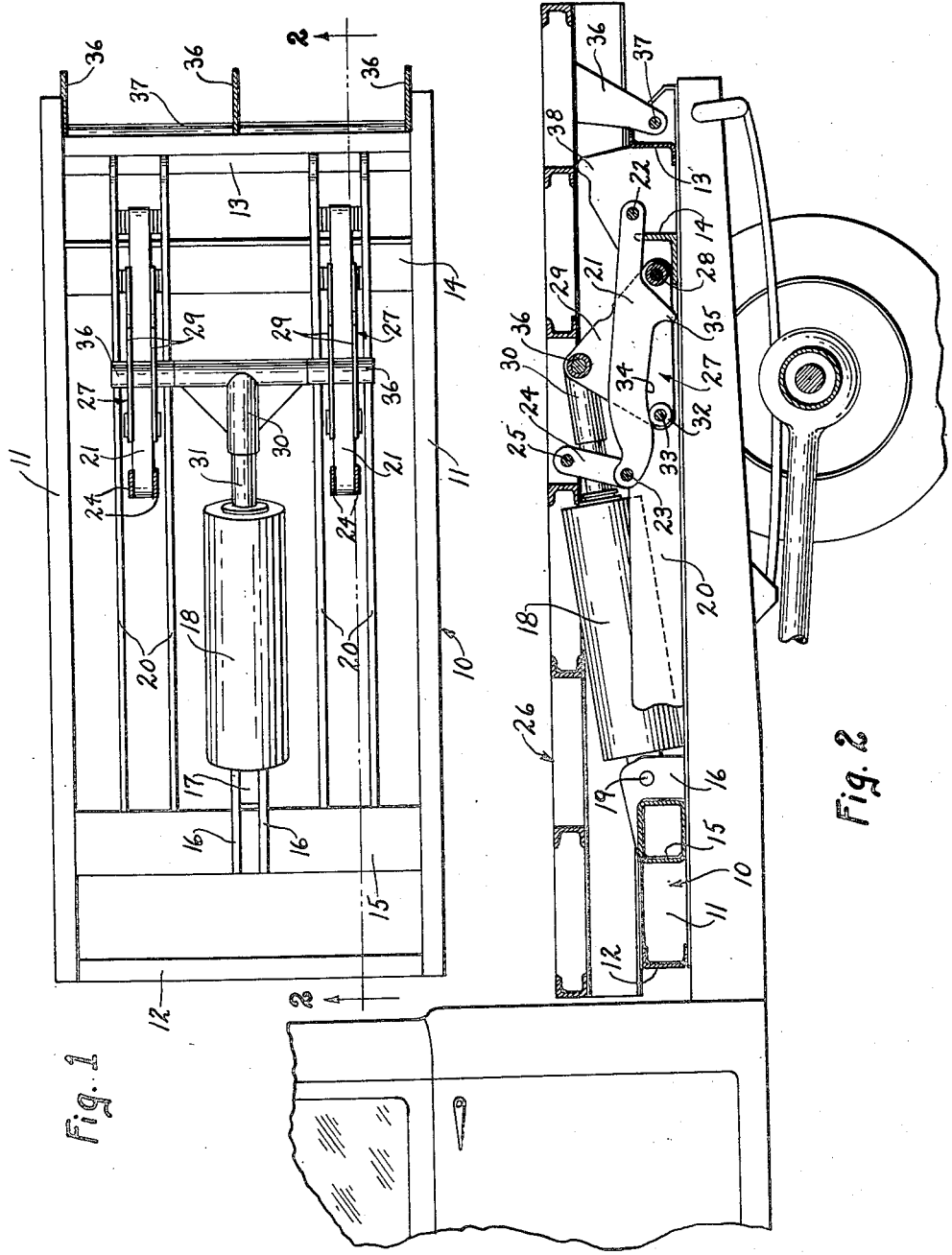
INVENTOR.
ANTHONY J. TRIPODI
BY
ATTORNEY

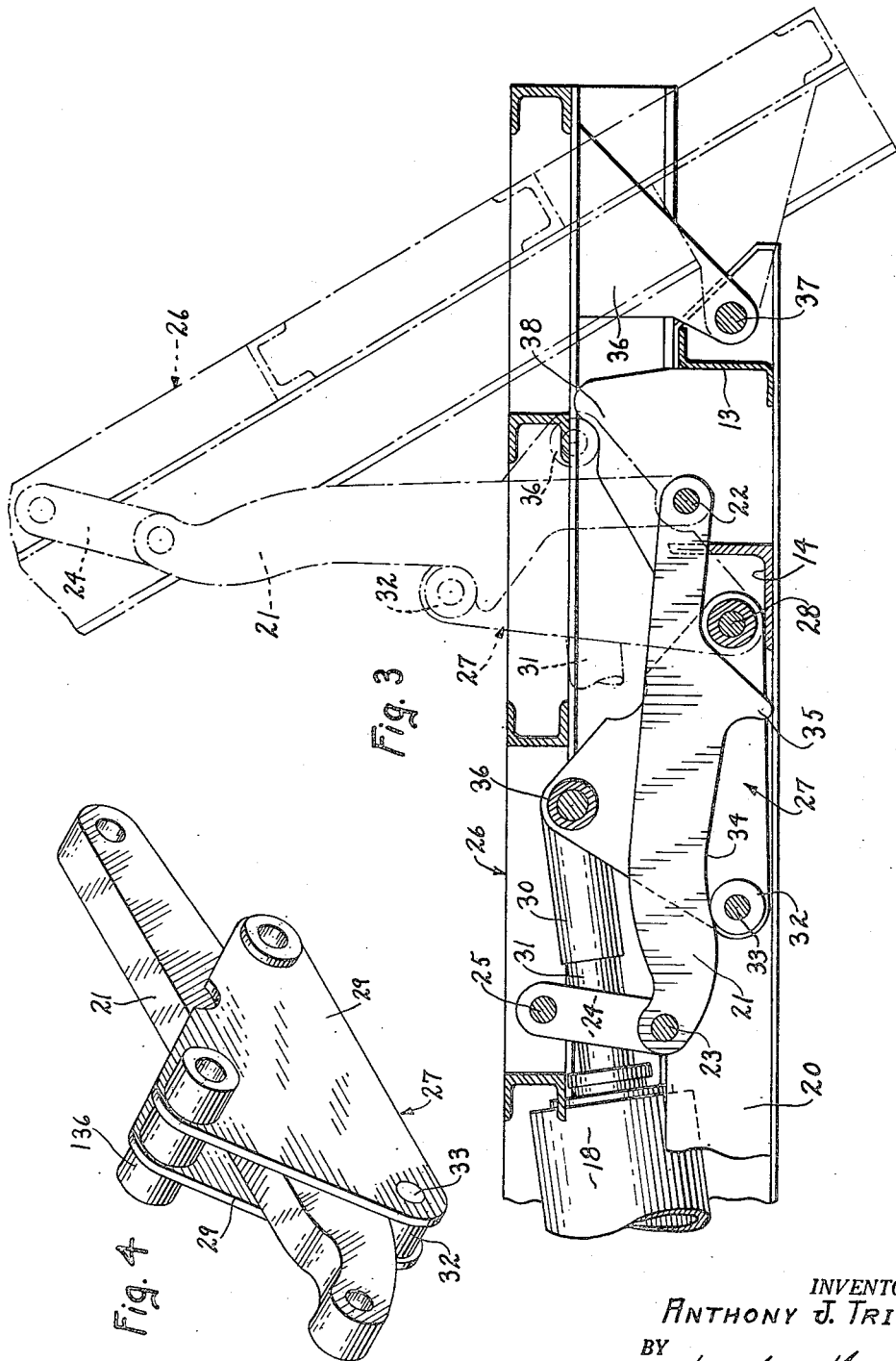

Patented Jan. 26, 1954

2,667,381

UNITED STATES PATENT OFFICE 2,667,381

MECHANISM FOR ACTUATING DUMP BODIES

Anthony J. Tripodi, Niles, Ohio, assignor to The Lodestar Corporation, a corporation of Ohio Application September 27, 1950, Serial No. 187,080

4 Claims. (Cl. 298—22)

My invention relates to mechanisms for actuating the tiltable body of load dumping vehicles, and the principal object of my invention is to provide new and improved mechanisms of this type.

Some of the many problems that must be solved in order to devise a satisfactory dumping mechanism may be touched upon briefly as follows: Available space for any type of mechanism is seriously limited; the mechanism is subject to much abuse from dirt, water and such; and the loads imposed upon the mechanism are very high. Additionally, a satisfactory mechanism must be reasonably inexpensive to manufacture, must operate for protracted periods of time with little or no attention and must be readily adapted for installation on all standard make vehicles. My invention solves these and other problems in a novel manner and possesses advantages hitherto not possessed by truck dumping mechanisms.

As was previously mentioned, space for the mechanism is extremely limited, and further complicating the design is the requirement that road clearance must be maintained. These factors, together with others, make it mandatory to mount the actuating fluid cylinder in a nearly horizontal position. Unfortunately however, this mounting places the cylinder at a serious mechanical disadvantage. Its line of action is approximately 90 degrees removed from the necessary direction of force application required to tilt the dump body, and consequently, this direction of force application must be rotated, by means of levers or such, into a more advantageous positon.

My invention changes the direction of force application by means of links and levers and also provides a varying mechanical advantage for the fluid cylinder during the dumping operation. The latter is an important feature of my invention as it provides for a great multiplication of cylinder thrust during the first stages of the dumping operation when the load must be started from rest. As the dump body is tilted and the center of gravity of the load shifts nearer the body's pivotal point, the force required to further tilt the body diminishes. As this force requirement lessens, my invention decreases the multiplication of cylinder thrust and increases the rate of lift. The ultimate result of this construction provides for a substantially uniform resistance to the cylinder thrust and consequently a uniform fluid pressure throughout the dumping operation. These and other advantages of my invention will become apparent by consideration of the following specification and the accompanying drawings.

In the drawings accompanying this specification and forming a part of this application, there is shown, for purposes of illustration, an embodiment which my invention may assume, and in these drawings:

Figure 1 is a top plan view of my improved dumping mechanism, certain parts being omitted in the interest of clarity;

Figure 2 is a side elevational view generally corresponding to the line 2—2 of Figure 1 and showing the mechanism installed on a truck, the truck being shown fragmentarily;

Figure 3 is an enlarged fragmentary view similar to Figure 2, certain parts being shown in dot-dash lines in the raised position; and Figure 4 is an enlarged perspective view of certain operating parts.

Referring to the accompanying drawings, the disclosed embodiment of my invention comprises a frame structure 10, composed of longitudinal and transverse members welded or otherwise suitably secured together. The outer longitudinal members 11 and the forward transverse member 12 are herein shown to be inwardly turned channel sections, and the rearmost transverse member 13 is a Z section. An angle member 14 is secured transversely between the channel members 11, and a box section member 15 is also secured transversely between the members 11. A pair of apertured ears 16, secured to the member 15, are spaced to closely receive therebetween an apertured tongue 17 formed at one end of a fluid cylinder 18. A pin 19, passing through the aligned apertures, pivotally secures the cylinder 18 to the frame 10.

As best seen in Figures 1 and 2, longitudinal members 20 are secured in spaced relation between the transverse members 13 and 15 in order to strengthen the frame assembly and for other purposes later to be disclosed. The upright leg of the angle 14 has spaced slots to permit passage therethrough of the members 20.

A link 21 is pivotally secured at one end between each pair of members 20 by means of a pin 22, the other end of each link 21 being pivotally connected between the spaced legs of a link member 24 by a pin 23. The other end of link 24 is pivotally secured at 25 to a frame 26 of a dump body (not shown). The dump body frame 26 is pivotally secured to the frame 10 by means of brackets 36 and cross shaft 37.

A triangularly shaped bell-crank 27 is pivotally secured between adjoining pairs of members 20 by a pin 28, and each bell-crank 27 comprises a pair of side plates 29 secured together in spaced relation by means of a tubular member 136. The side plates 29 are spaced to receive a respective link 21 therebetween. Each bell-crank 27 is pivotally secured to a cross-head 30 which in turn is secured to a piston rod 31 of the cylinder 18. As best seen in Figures 2, 3 and 4, a roller 32 is carried between the plates 29 of each bell-crank lever 27 by means of a pin 33.

As illustrated in Figures 2 and 3, each of the links 21 has its lower surface adapted to form a cam 34 engageable with a roller 32 carried by a respective bell-crank lever 27. A projection 35 is formed at one end of each cam 34 for a purpose later to be shown.

Operation of the embodiment of my invention herein disclosed is as follows: In order to tilt the body and dump the load, fluid under pressure is admitted to the cylinder 18 in manner to force the piston rod 31 outwardly of the cylinder. This movement of the piston rod is transmitted to the bell-crank levers 27 through the cross-head 30 and causes rotation of the bell-crank lever about the pivots 28. As the bell-crank levers are rotated, the rollers 32 will roll along respective cam surfaces 34 and cause respective links 21 to pivot about pins 22. The end of links 21 opposite pivots 22 will describe an upward arc, forcing respective links 24 and the dump body frame 26 upwardly and causing the dump body to rotate about the pivot 37 to the position shown in dot-dash lines of Figure 3.

An upper limit stop prevents the dump body from tilting beyond the position shown in dot-dash lines. This stop is herein shown to be provided by means of the projections 35 formed as part of respective cam surfaces 34. When the rollers 32 engage the projections 35, the mechanism becomes locked and further tilting of the dump body is effectively resisted. Another stop is provided in the event that certain parts of the mechanism should become broken. This stop is provided by an upwardly projecting portion 38 of each of the longitudinal members 20. As best seen in Figure 3, the portions 38 may engage with the tubular members 136 of the respective bell-crank levers 27 and prevent further outward movement of the piston rod 31.

From careful consideration of Figure 3, it will be seen that the curved cam-like surface 34 of the links 21 provide a wedge-like action between the links 21 and the rollers 32. This wedge-like action provides increased lifting force at the early part of the stroke when the lifting force must be greatest and then as the body is tilted and the center of gravity of the load shifts toward the pivotal point, the cam-like surface accelerates the lifting operation to its conclusion. Thus it may be seen that the cam-like surface causes the load upon the cylinder to be substantially uniform throughout the dumping operation, even though the force required to dump the body gradually decreases from its maximum at the start of the operation.

From the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A truck dumping mechanism adapted to be operated by a fluid cylinder, comprising: a frame; a dump body pivotally secured to said frame; link means connecting said frame and said dump body, said link means having a cam-like surface; abutment means forming a portion of said cam-like surface and adapted to function as a limit stop; roller means movable over said cam-like surface and being engageable with said abutment means; and bell-crank means pivotally secured to said frame and having a portion pivotally attached to the piston rod of said fluid cylinder, said bell-crank means carrying said roller means in contact with said cam-like surface in manner to provide a variable lifting ratio throughout the dumping operation.

2. A truck dumping mechanism adapted to be operated by a fluid cylinder, comprising: a frame, a dump body pivotally secured to said frame; link means connecting said frame and said dump body, said link means having a cam-like surface; roller means engageable with said cam-like surface; abutment means secured to said frame and adapted to function as a limit stop; and bell-crank means pivotally secured to said frame and engageable with said abutment means, said bell-crank means having a portion thereof pivotally attached to the piston rod of said fluid cylinder and carrying said roller means in contact with said cam-like surface in manner to provide a variable lifting ratio throughout the dumping operation.

3. A truck dumping mechanism adapted to be operated by a fluid cylinder, comprising: a frame; a dump body pivotally secured to said frame; link means connecting said frame and said dump body, said link means having a cam-like surface; abutment means forming a terminal end of said cam-like surface and adapted to function as a limit stop; roller means movable over said cam-like surface and being engageable with said abutment means; safety means secured to said frame and also adapted to function as a limit stop; and bell-crank means pivotally secured to said frame and engageable with said safety means, said bell-crank having a portion thereof pivotally attached to the piston rod of said fluid cylinder and carrying said roller means in contact with said cam-like surface in manner to provide a variable lifting ratio throughout the dumping operation.

4. A truck dumping mechanism adapted to be operated by a fluid cylinder having a piston rod with a cross-head, comprising: a frame; a dump body pivotally secured to said frame; means connecting said frame and said dump body, comprising a first link means and a second link means pivotally secured together at one of their respective ends, said first link means having its free end pivotally secured to said dump body and said second link means having its free end pivotally attached to said frame, said second link means having a portion intermediate its ends formed to provide a cam-like surface; abutment means forming a terminal portion of said cam-like surface and adapted to function as a limit stop; roller means movable over said cam-like surface and engageable with said abutment means; safety means secured to said frame and adapted to function as a limit stop; and bell-crank means pivotally secured to said frame and engageable with said safety means, said bell-crank means comprising two side members spaced to receive said second link means therebetween and also having a portion adapted to be pivotally secured to said cross-head, said bell-crank means carrying said roller means in contact with said cam-like surface in manner to provide a variable lifting ratio throughout the dumping operation.

ANTHONY J. TRIPODI.

References Cited in the file of this patent

UNITED STATES PATENTS

| Number | Name | Date |
|---|---|---|
| 1,536,959 | Martin | May 5, 1925 |
| 1,668,203 | Hansen | May 1, 1928 |
| 2,094,521 | Biszantz | Sept. 28, 1937 |
| 2,144,828 | Biszantz et al. | Jan. 24, 1939 |
| 2,192,128 | Bhrick et al. | Feb. 27, 1940 |